(12) United States Patent
Kitagawa et al.

(10) Patent No.: US 9,120,904 B2
(45) Date of Patent: Sep. 1, 2015

(54) EXPANDABLE PHENOLIC RESIN COMPOSITION, PHENOLIC RESIN FOAM, AND METHOD FOR PRODUCING THE PHENOLIC RESIN FOAM

(75) Inventors: Takatoshi Kitagawa, Tokyo (JP); Hisashi Mihori, Tokyo (JP); Yoshihito Fukasawa, Tokyo (JP)

(73) Assignee: ASAHI KASEI CONTRUCTION MATERIALS CORPORATION, Tokyo (JP)

( * ) Notice: Subject to any disclaimer, the term of this patent is extended or adjusted under 35 U.S.C. 154(b) by 225 days.

(21) Appl. No.: 13/128,096

(22) PCT Filed: Nov. 4, 2009

(86) PCT No.: PCT/JP2009/068833
§ 371 (c)(1),
(2), (4) Date: Jul. 19, 2011

(87) PCT Pub. No.: WO2010/053093
PCT Pub. Date: May 14, 2010

(65) Prior Publication Data
US 2011/0263731 A1    Oct. 27, 2011

(30) Foreign Application Priority Data
Nov. 7, 2008  (JP) ................ P2008-286963

(51) Int. Cl.
*C08J 9/35*   (2006.01)
*C08J 9/14*   (2006.01)
*C08J 9/00*   (2006.01)

(52) U.S. Cl.
CPC ........... *C08J 9/141* (2013.01); *C08J 9/0061* (2013.01); *C08J 9/146* (2013.01); *C08J 2361/06* (2013.01); *C08J 2471/00* (2013.01)

(58) Field of Classification Search
CPC .......... C08J 9/0061; C08J 9/141; C08J 9/146; C08J 2361/06; C08J 2471/00
USPC ............... 521/88, 98, 131, 136, 181
See application file for complete search history.

(56) References Cited

U.S. PATENT DOCUMENTS 4,530,939 A * 7/1985 Rickle .................. 521/110
4,576,972 A * 3/1986 Lunt et al. ............. 521/136
4,882,364 A   11/1989 Kyle et al.
4,900,759 A * 2/1990 Clark et al. ............ 521/98
5,407,963 A   4/1995 Willson et al.
5,655,276 A   8/1997 Pattanayak et al.
5,700,847 A   12/1997 Thompson
7,897,652 B2  3/2011 Re'em

FOREIGN PATENT DOCUMENTS

| EP | 0 305 084 A2 | 3/1989 |
|----|---|---|
| JP | 60-35033 A | 2/1985 |
| JP | 5-154932 A | 6/1993 |
| JP | 9-503547 A | 4/1997 |
| JP | 10-225993 A | 8/1998 |
| JP | 11-512131 A | 10/1999 |
| JP | 2001-26649 A | 1/2001 |
| JP | 3243571 B2 | 1/2002 |
| JP | 2007-246610 A | 9/2007 |
| JP | 2008-88208 A | 4/2008 |
| RU | 2 67890 C2 | 5/2001 |
| RU | 2167890 C2 | 5/2001 |
| RU | 2291170 C2 | 1/2007 |
| TW | 354314 | 3/1999 |
| WO | WO 97/08230 A1 | 3/1997 |
| WO | WO 2009/066621 A1 | 5/2009 |

OTHER PUBLICATIONS

Saito et al., Abstract of "Volume increase of phenol resin adhesives caused by foaming agents," Database CA [Online], Chemical Abstracts Service, Columbus, Ohio, US, 1976, XP-002684877.
Supplementary European Search Report for corresponding European Application No. 09824792.7, dated Oct. 22, 2012.
International Preliminary Report on Patentability and English translation of the Written Opinion of the International Searching Authority dated Jun. 30, 2011 for Application No. PCT/JP2009/068833 (PCT/IB/338, PCT/ISA/237 and PCT/IB/373).
International Search Report dated Jan. 19, 2010 in International Application No. PCT/JP2009/068833.
Notice of Allowance for corresponding Russian Patent Application No. 2011118427, dated Feb. 12, 2013.

* cited by examiner

*Primary Examiner* — Irina S Zemel

(74) *Attorney, Agent, or Firm* — Birch, Stewart, Kolasch & Birch, LLP

(57) ABSTRACT

There is provided an expandable phenolic resin composition comprising: a phenolic resin; an acid curing catalyst for the resin; a foaming agent; and a surfactant, wherein the foaming agent comprises a hydrocarbon-based foaming agent; and the surfactant is a polyoxyethylene alkyl ether having an alkyl ether moiety having 14 to 22 carbon atoms, and the content of the surfactant is 0.01 to 10 parts by weight relative to 100 parts by weight of the phenolic resin.

10 Claims, No Drawings

US 9,120,904 B2

EXPANDABLE PHENOLIC RESIN COMPOSITION, PHENOLIC RESIN FOAM, AND METHOD FOR PRODUCING THE PHENOLIC RESIN FOAM

TECHNICAL FIELD

The present invention relates to an expandable phenolic resin composition, phenolic resin foam, and a method for producing the phenolic resin foam.

BACKGROUND ART

It is common to produce a phenolic resin foam by reacting, at ordinary temperature or by heating, a mixture in which a surfactant, a foaming agent, and a curing catalyst are mixed with a resol-type phenolic resin obtained by condensing phenol and formalin with an alkaline catalyst. In this case, a method in which the mixture is discharged on a surface material running at a constant speed and then formed into a sheet between conveyors in a curing oven is often used. The discharge method includes a method utilizing so-called tournament type distribution nozzles as proposed in Patent Literature 1. Further, there is a method which discharges the mixture integrally into a sheet utilizing a die as proposed in Patent Literature 2.

CITATION LIST

Patent Literature 1: Japanese Patent No. 3243571
Patent Literature 2: International publication No. WO 2009066621

SUMMARY OF INVENTION

Technical Problem

In such a method of discharging from a plurality of discharge nozzles, since the production of a thermosetting resin foam is performed while irreversibly advancing a reaction, scale adhesion tends to occur in facilities such as a distribution channel, and since the scale grows with the operating time, the difference in the soiling degree between the channels steadily spreads with time, with the difference between the adhesion/growth of the scale due to a slight environmental difference between the distributed channels.

When the flow rate difference between the channels becomes large, a resin composition tends to flow in the width direction (transverse direction) from a higher flow rate channel to a lower flow rate channel so as to fill space. Moreover, in order to form the foam into a sheet, it is necessary to extend the resin composition in the width direction (transverse direction) by applying pressure from the top and bottom sides. At this time, transverse flow of the resin composition arises. And, during the transverse flow, voids are formed by the movement involving air in space, and coalescence and foam rupture occur because cells cannot endure the pressure and deformation caused by the transverse flow; and in the foam sheet finally obtained, the voids tend to be formed between the surface layer part and the inner layer part. The formed voids are not preferred because they cause reduction in physical properties such as strength of a product.

As described above, if production is continued by simply distributing channels, a state in which voids are easily formed arises with time and the performance of a product is reduced, and so a short-time continuous running is possible after adding a curing catalyst and starting production continuously, but it is difficult to stably obtain a product for a long time. Therefore, if it is possible to achieve stable production for a longer time, production efficiency can be improved and the cost reduction effect can also be expected. Further, in the case of discharging the resin composition integrally into a sheet by utilizing a die, a product can be stably obtained for a longer time as compared with a method of distributing and discharging the resin composition from a plurality of discharge nozzles. However, the same problem as in the case of the method of distributing and discharging the resin composition from a plurality of discharge nozzles may occur because the thickness of a resin composition in a sheet form becomes non-uniform if scale adheres to the vicinity of the die lip discharge port.

As a technique to prevent the voids caused by the transverse flow as described above from occurring, there is considered a method in which the number of distributing nozzles is increased and the space between the nozzles is narrowed, thereby minimizing the amount of the transverse flow. However, in this method, if the number of nozzles is simply increased, it is considered that the flow rate per nozzle will decrease, the flow velocity will become slow, the scraping effect of a wall surface will fade, and the adhesion/growth of scale will be promoted, which may increase the difference of the flow rate for each nozzle.

Then, as a method of obtaining a good product by suppressing the occurrence of voids by forming cells which are hardly undergo coalescence and foam rupture even if the transverse flow as described above arises, there is considered a method in which the coalescence of the cells and foam rupture are suppressed by optimizing a surfactant. In controlling the cells, the affinity between a surfactant and a foaming agent is also an important factor, and the affinity also changes with the difference between the types of gases such as chlorofluorocarbons and hydrocarbons which are generally used as a foaming agent, as proposed in National Publication of International Patent Application No. 09-503547 and National Publication of International Patent Application No. 11-512131. This effect can suppress voids caused by the flow rate difference between the nozzles generated in short-time operating time, but the voids will occur in prolonged operation since the flow rate difference becomes large. However, in general, if the amount of a surfactant to be added is increased, the effect of suppressing void formation will be improved, and further extension of operating time will be achieved.

However, since a surfactant is relatively expensive in raw materials and addition of a large amount thereof increases cost, a method of suppressing void formation without increasing the amount of a surfactant to be added has been required.

An object of the present invention is to provide an expandable phenolic resin composition which can produce a phenolic resin foam in which reduction in appearance and product physical properties has been suppressed to a practically sufficient level. Another object of the present invention is to provide a phenolic resin foam obtained from the expandable phenolic resin composition and a method for producing a phenolic resin foam.

SOLUTION TO PROBLEM

The present invention provides the following [1] to [6].
[1] An expandable phenolic resin composition comprising: a phenolic resin; an acid curing catalyst for the resin; a foaming agent; and a surfactant, wherein the foaming agent comprises a hydrocarbon-based foaming agent; and the surfactant is a polyoxyethylene alkyl ether having an alkyl ether moiety having 14 to 22 carbon atoms, and the content of the surfactant is 0.01 to 10 parts by weight relative to 100 parts by weight of the phenolic resin.

[2] A method for producing a phenolic resin foam comprising: foaming and curing an expandable phenolic resin composition comprising a phenolic resin, an acid curing catalyst for the resin, a foaming agent, and a surfactant, wherein the foaming agent comprises a hydrocarbon-based foaming agent; and the surfactant is a polyoxyethylene alkyl ether having an alkyl ether moiety having 14 to 22 carbon atoms, and the content of the surfactant is 0.01 to 10 parts by weight relative to 100 parts by weight of the phenolic resin.

[3] The production method according to [2], wherein the alkyl ether moiety has 16 to 18 carbon atoms.

[4] The production method according to [2] or [3], wherein the content of the surfactant is 0.3 to 5 parts by weight relative to 100 parts by weight of the phenolic resin.

[5] The production method according to any of [2] to [4], wherein the polyoxyethylene alkyl ether is a polyoxyethylene alkyl ether having an HLB of 15 to 20.

[6] The production method according to any of [2] to [5], wherein the foaming agent consists of the hydrocarbon-based foaming agent.

Advantageous Effects of Invention

By the present invention, an expandable phenolic resin composition is provided which can produce a phenolic resin foam stably for a long time by preventing the coalescence of cells and foam rupture caused by transverse flow of the resin composition in the inner part of the foam sheet from the discharge to the forming. A phenolic resin foam can be obtained by foaming and curing such an expandable phenolic resin composition, and the resulting phenolic resin foam is the one in which reduction in appearance and product physical properties has been suppressed to a practically sufficient level.

DESCRIPTION OF EMBODIMENTS

Hereinafter, the present invention will be described in detail based on suitable embodiments thereof.

An expandable phenolic resin composition according to the embodiments comprises a phenolic resin, an acid curing catalyst of the resin, a foaming agent, and a surfactant as essential ingredients and is used as a raw material for producing a phenolic resin foam. The expandable phenolic resin composition may contain an additive other than the above essential ingredients in the range which does not impair the effect of the present invention.

The phenolic resin which the expandable phenolic resin composition contains includes a resol-type phenolic resin synthesized with an alkali metal hydroxide or an alkaline earth metal hydroxide. Other than the resol-type phenolic resin, the phenolic resin includes a novolac-type phenolic resin synthesized with an acid catalyst, an ammonia resol-type phenolic resin synthesized with ammonia, and a benzyl ether-type phenolic resin synthesized with lead naphthenate, and the resol-type phenolic resin is preferred. Note that the phenolic resin may be a mixture of different types.

The resol-type phenolic resin is obtained, for example, by using phenol and formalin as raw materials and heating to polymerize them in a temperature range of 40 to 100° C. with an alkaline catalyst. Further, an additive such as urea may optionally be added during the resol resin polymerization. When adding the urea, it is more preferable to mix a urea which is previously methylolated with an alkaline catalyst with the resol resin. Since the resol resin after synthesis generally contains excessive water, the content of water is controlled to a level suitable to foaming, when the resin is foamed. Further, it is also possible to add, to the phenolic resin, an aliphatic hydrocarbon, an alicyclic hydrocarbon having a high-boiling point, or a mixture thereof, and a diluent for viscosity control such as ethylene glycol and diethylene glycol, and optionally other additives.

The starting molar ratio of phenols to aldehydes in the phenolic resin is preferably in the range of 1:1 to 1:4.5, more preferably in the range of 1:1.5 to 1:2.5. Phenols preferably used in phenolic resin synthesis include phenol and a compound having a phenol skeleton. Examples of the latter include resorcinol, catechol, o-, m- and p-cresol, xylenols, ethylphenols, p-tert butylphenol, and the like. Binuclear phenols can also be used.

Aldehydes used in the production of the phenolic resin include formaldehyde and aldehyde compounds other than formaldehyde. Examples of the latter include glyoxal, acetaldehyde, chloral, furfural, benzaldehyde, and the like. Urea, dicyandiamide, melamine, and the like may be added as additives to aldehydes. Note that, when adding these additives, the phenolic resin refers to that after the additives are added.

In the case of using a resol-type phenolic resin, the viscosity at 40° C. is preferably 3,000 mPa·s to 100,000 mPa·s. The viscosity at 40° C. is more preferably 5,000 mPa·s to 50,000 mPa·s. Further, the water content in the resol-type phenolic resin is preferably 3% to 30% by weight.

The acid curing catalyst which the expandable phenolic resin composition contains may be an acid curing catalyst which can cure the phenolic resin mentioned above. However, since there is a possibility that rupture of a foam cell wall or the like may take place when an acid containing water is used, an acid anhydride curing catalyst is preferred. Phosphoric anhydride and anhydrous aryl sulfonic acid are preferred as the acid anhydride curing catalyst. The anhydrous aryl sulfonic acid includes toluenesulfonic acid, xylene sulfonic acid, phenolsulfonic acid, a substituted phenolsulfonic acid, xylenol sulfonic acid, a substituted xylenol sulfonic acid, dodecylbenzenesulfonic acid, benzenesulfonic acid, naphthalene sulfonic acid, and the like, and these may be used singly or in combination of two or more. Further, resorcinol, cresol, saligenin (o-methylolphenol), p-methylolphenol, and the like may be added as a curing auxiliary. Further, these curing catalysts may be diluted with a solvent such as ethylene glycol and diethylene glycol.

The amount of the acid curing catalyst used differs according to the type, and when phosphoric anhydride is used, it is used in an amount of preferably 5 to 30 parts by weight, more preferably 8 to 25 parts by weight, relative to 100 parts by weight of the phenolic resin. When using a mixture of 60% by weight of para toluene sulfonic acid monohydrate and 40% by weight of diethylene glycol, it is used in an amount of preferably 3 to 30 parts by weight, more preferably 5 to 20 parts by weight, relative to 100 parts by weight of the phenolic resin.

The foaming agent which the expandable phenolic resin composition contains may be the one comprising a hydrocarbon-based foaming agent, and may comprise other foaming agents. The content of the hydrocarbon-based foaming agent in the foaming agent is preferably 50% by weight or more, more preferably 70% by weight or more, further preferably 90% by weight or more, on the basis of the whole amount of the foaming agent. If the content of the hydrocarbon-based foaming agent is less than 50% by weight, the global warming potential of the foaming agent becomes large, which is undesirable. Note that, the hydrocarbon-based foaming agent means a foaming agent composed of hydrocarbon such as alkane, alkene, and alkyne.

The hydrocarbon-based foaming agent contained in the foaming agent is preferably a cyclic or linear alkane, alkene, and alkyne each having 3 to 7 carbon atoms, and specific examples include normal butane, isobutane, cyclobutane, normal pentane, isopentane, cyclopentane, neopentane, normal hexane, isohexane, 2,2-dimethylbutane, 2,3-dimethylbutane, cyclohexane, and the like. Among them, pentanes including normal pentane, isopentane, cyclopentane, and neopentane, and butanes including normal butane, isobutane, and cyclobutane are preferred.

The above hydrocarbon-based foaming agent can be used singly or in combination of two or more. Further, as the foaming agent, it is also possible to use HFCs such as 1,1,1,2-tetrafluoro ethane, 1,1-difluoroethane, and pentafluoro ethane, and chlorine-based hydrocarbons such as 2-chloropropane, in combination with the above hydrocarbon-based foaming agent.

The amount of the foaming agent used differs according to the type thereof. For example, when a mixture of 50% by weight of isopentane and 50% by weight of isobutane is used as the foaming agent, the amount of the mixture used is preferably 2 to 20 parts by weight, more preferably 4 to less than 17 parts by weight relative to 100 parts by weight of the phenolic resin. Further, a low boiling material such as nitrogen, helium, argon, and air may be added to the foaming agent for use as a foaming nucleating agent.

The surfactant which the expandable phenolic resin composition contains is a polyoxyethylene alkyl ether having an alkyl ether moiety having 14 to 22 carbon atoms and belongs to a nonionic surfactant. As the polyoxyethylene alkyl ether having an alkyl ether moiety having 14 to 22 carbon atoms, a compound represented by the following structural formula (1) is preferred. In the formula, R is an alkyl group having 14 to 22 carbon atoms, preferably an alkyl group having 16 to 18 carbon atoms. Further, n is preferably 30 to 60, more preferably 35 to 55.

R—O—(CH$_2$CH$_2$O)n-H  (1)

The content of the surfactant is not particularly limited, but is preferably 0.01 to 10 parts by weight, more preferably 0.3 to 5 parts by weight, further preferably 0.5 to 4 parts by weight, relative to 100 parts by weight of the phenolic resin.

Further, the surfactant is preferably a polyoxyethylene alkyl ether having an HLB (Hydrophile-Lipophile Balance) of 15 to 20, and the HLB is more preferably 17 to 19.

It is possible to detect and quantify the content of the polyoxyethylene alkyl ether, which is the surfactant used in the present invention, in the phenolic resin foam from a relatively low concentration to a high concentration by the analysis with measuring devices to be listed below.

The measuring device mentioned first is a matrix assisted laser desorption ionization-time of flight mass spectrometer (MALDI-TOF/MS). The analysis with this device is a soft ionization method in which a mixture of a matrix and a measurement sample is irradiated with a laser beam and sample molecules are ionized through the matrix, and so it has a feature that the sample molecules can be ionized without decomposition and molecules having high molecular weight can also be measured. The polyoxyethylene alkyl ether used in the present invention has a relatively high molecular weight, which may exceed a measurable mass range with thermal decomposition GC-MS and LC-MS, but is in a measurable range with MALDI-TOF/MS. Further, in the case of the polyoxyethylene alkyl ether, since it is easily ionized and so is highly sensitive, it can be detected with this measuring device even if it is present in a low concentration.

Next, the measuring device mentioned is NMR. This device is a measuring device using nuclear magnetic resonance, and since the position of a peak (chemical shift) measured differs according to the chemical environment of nuclear species, it can specify the structure of a measuring substance. Further, since the molar ratio can be quantified from the integral value of the peak, it is possible to quantify the polyoxyethylene alkyl ether used in the present invention using an internal standard method.

In order to analyze a surfactant in the phenolic resin foam, it is first necessary to extract the surfactant from the phenolic resin foam. For example, the phenolic resin foam is cut into a certain size and ground with a pestle and a mortar to form a fine powder, and 1 gram of the fine powder is extracted with chloroform as a solvent over about 8 hours using a Soxhlet extractor. The extracted material can be dried and weighed to determine the amount of the extract. The dried material is measured with MALDI-TOF/MS. At this time, a sodium iodide/acetone solution can be used as an ionization auxiliary, and a dithranol/chloroform solution can be used as a matrix. For example, when measuring polyoxyethylene stearyl ether having a C18 alkyl group in which HLB=17.6, a most frequent peak appears near 2010, and a peak interval is detected by about 44. The presence of the polyoxyethylene alkyl ether can be estimated from this detection state, and the amount thereof can be estimated from the height (strength) of the peak.

Further, the same dried sample as described above is dissolved in a deuterated chloroform solvent, and the resulting solution is used for specifying the amount of the polyoxyethylene alkyl ether in the dried sample by NMR using dimethyl sulfoxide as an internal standard substance, for example, at 400 MHz, from the intensity of the peaks which appear at 2.6 PPM and 3.6 PPM. When the polyoxyethylene stearyl ether having a C18 alkyl group in which HLB=17.6 as mentioned above is measured from a phenolic resin foam, the amount thereof in the foam is determined by using a calibration curve between the amount of the surfactant added and the amount of the surfactant in the Soxhlet extract, for a known sample, because a component other than the surfactant is extracted in the Soxhlet extraction. By measuring in this way, the amount of the polyoxyethylene alkyl ether which is present in the phenolic resin foam can be measured with high accuracy even if its content in the sample is a trace amount.

As described above, the presence of the polyoxyethylene alkyl ether becomes clear by using MALDI-TOF/MS for specifying the type of a surfactant, and it is possible to identify whether the content is high or low. In addition to it, the content of the polyoxyethylene alkyl ether can be specified with good accuracy by quantifying, using an internal standard method by NMR.

The expandable phenolic resin composition may contain additives, and an example thereof includes a phenolic resin foam powder. The phenolic resin foam powder refers to a powder obtained by grinding the phenolic resin foam, and it is also effective in cost reduction to reuse the end material and discarded material of the phenolic resin foam produced in the production process from the viewpoint of material recycling. The amount of the phenolic resin foam powder mixed with the phenolic resin is desirably 20 parts by weight or less relative to 100 parts by weight of the phenolic resin when the fluidity of the phenolic resin in the piping is taken into consideration. This is because the viscosity of the phenolic resin is increased and the fluidity thereof is reduced when the amount of the phenolic resin foam powder is increased. Further, if the phenolic resin foam powder is added in an amount of less than 0.01 part by weight, the meaning of adding the powder will be lost. Therefore, the amount of the phenolic resin foam powder is preferably 0.01 to 20 parts by weight, more preferably 3 to 12 parts by weight.

The expandable phenolic resin composition can be produced by mixing the components mentioned above. The expandable phenolic resin composition may contain all the components immediately before production of the phenolic resin foam, and the components may have been separately stored before production. Note that, when adding the acid curing catalyst to the phenolic resin, it is preferred to uniformly disperse the acid curing catalyst as quickly as possible using a pin mixer or the like.

The expandable phenolic resin composition as described above can be foamed and cured to obtain the phenolic resin foam.

The foaming and curing of the phenolic resin foam can be performed at ordinary temperature or by heating, and a method in which the expandable phenolic resin composition is discharged on a surface material running at a constant speed and then formed into a sheet between conveyors in a curing oven can be employed.

The surfactant and the foaming agent may be previously added to the phenolic resin or may be added simultaneously with the acid curing catalyst. A method of mixing these components with the phenolic resin is not particularly limited, but a hand-mixer, a pin mixer, or the like may be utilized for the mixing, or a twin screw extruder, a kneading machine, or the like may be used.

A method in which the expandable phenolic resin composition is mixed using a mixer, discharged from the distribution part of the mixer, and then pressurized first in the top and bottom direction so as to be formed into a sheet includes various methods depending on the object of production such as a method of utilizing a slat-type double conveyor, a method of utilizing a metal roll or a steel sheet, and a method of utilizing them in combination.

Among these, when, for example, the slat-type double conveyor is utilized, the expandable phenolic resin composition is discharged from the distribution part of the mixer onto a bottom surface material which runs continuously, covered with a top surface material which similarly runs continuously, guided continuously into the slat-type double conveyor, pressurized in the top and bottom direction with heating, controlled to a predetermined thickness, foamed and cured, and formed into a sheet.

When the expandable phenolic resin composition is discharged from the distribution part and then formed into a sheet, the expandable phenolic resin composition is in the state where it is driven in the transverse direction by the pressure from the top and bottom, which applies excessive pressure to the cells, and coalescence and foam rupture tend to occur. The voids accompanying the coalescence or foam rupture at this time reduce the physical properties of the phenolic resin foam, and so it is a method of obtaining a good product with stability to prevent the coalescence and foam rupture.

In order to obtain a good product, it is necessary to form cells which are hard to rupture against the drive in the transverse direction of the resin composition as described above. When a surfactant used in the present invention, which is a polyoxyethylene alkyl ether having an alkyl group having 14 to 22 carbon atoms, is used, it is possible to form cells which are fine, uniform, and stable, and it is possible to disperse the transverse flow of the resin composition, which is produced by the pressure in the top and bottom direction during the forming into a sheet, to the width direction, to reduce the excessive pressure to the cells, and to suppress the voids caused by the coalescence of the cells and foam rupture. More preferably, the polyoxyethylene alkyl ether has an alkyl ether moiety having 16 to 18 carbon atoms.

Further, in order to obtain a good product, the content of the polyoxyethylene alkyl ether which is a surfactant is more preferably 0.3 to 5 parts by weight relative to 100 parts by weight of the phenolic resin.

And, in order to obtain a good product, the surfactant is more preferably a polyoxyethylene alkyl ether having an HLB of 15 to 20.

Furthermore, in order to further reduce the global warming potential during the product production, the foaming agent more preferably consists of a hydrocarbon-based foaming agent.

A flexible surface material is preferred as the surface material, and a synthetic fiber nonwoven fabric or paper is the most preferred, particularly in terms of the ease of handling as a foam laminated sheet and economical efficiency.

The curing temperature of the expandable phenolic resin composition is preferably 40° C. to 130° C., more preferably 60° C. to 110° C. The curing may be performed in one step or may be performed dividedly in several steps in which the curing temperature is changed depending on the conditions of curing.

The phenolic resin foam obtained by such a production method is the one in which reduction in appearance and product physical properties has been suppressed to a practically sufficient level, and since it is produced using the above-mentioned expandable phenolic resin composition, the coalescence of cells and foam rupture by the transverse flow of the resin composition in the inner part of the foam sheet from the discharge to the forming are prevented, and it is produced stably for a long time. Note that, in the phenolic resin foam, a foaming agent (or an evaporated material thereof) may be present in the voids formed by foaming.

EXAMPLES

The present invention will be described in further detail below with reference to Examples and Comparative Examples, but the present invention is not limited thereto.

The evaluation methods of composition, structure, and characteristics of phenolic resins and phenolic resin foam are as follows.

[Viscosity of phenolic resin]

The measured value was obtained after stabilization for 3 minutes at 40° C. using a rotational viscometer (R-100 type, the rotor part being 3°×R–14, manufactured by Toki Sangyo Co., Ltd.).

[Closed cell content]

A cylindrical sample having a diameter of 35 mm to 36 mm is hollowed out of a phenolic resin foam with a cork borer, cut to a height of 30 mm to 40 mm, and then measured for the sample volume according to a standard method for using an air comparison pycnometer (1,000 type, manufactured by Tokyoscience Co., Ltd.). The closed cell content is the quotient when the difference between the sample volume and the volume of a cell wall calculated from the sample weight and the resin density is divided by an apparent volume calculated from the external dimension of the sample, which was measured according to ASTM-D-2856. Here, the density of the phenolic resin was set to 1.3 kg/L.

[Thermal conductivity]

A phenolic resin foam sample of 200 mm square was measured for thermal conductivity in accordance with a plate heat flow meter method of JIS-A-1412 between a lower temperature plate at 5° C. and a higher temperature plate at 35° C.

[Average cell diameter]

The average cell diameter is the quotient when 1,800 μm is divided by an average value of the number of cells crossed by four straight lines each having a length of 9 cm drawn on a 50 time-enlarged picture of the cross section of a foam, which is an average value calculated from the number of cells measured according to JIS-K-6402.

[Compressive strength]

A foam was cut into a 10-cm square and measured for the compressive strength according to JIS-K7220. The resulting value was converted in terms of density, using a density of 27 kg/m$^3$.

<Synthesis of phenolic resin>

A reactor was charged with 3500 kg of 52% by weight formaldehyde and 2510 kg of 99% by weight phenol, which were stirred with a propeller rotating-type stirrer, and the reactor internal liquid temperature was adjusted to 40° C. with a temperature controller. Subsequently, the temperature was increased while adding a 50% by weight aqueous sodium hydroxide to allow the liquid to be reacted. At the stage where the Ostwald viscosity reached 60 centistokes (measured value at 25° C.), the reaction liquid was cooled and thereto was added 570 kg of urea (corresponding to 15 mol % of the amount of formaldehyde charged). Subsequently, the reaction liquid was cooled to 30° C. and neutralized to a pH of 6.4 with a 50% by weight aqueous solution of para toluene sulfonic acid monohydrate.

When the resulting reaction liquid was dehydrated at 60° C. and measured for viscosity and water content, the viscosity at 40° C. was 5,800 mPa·s, and the water content was 5% by weight. This is named as a phenolic resin A-U.

Example 1

As a surfactant, polyoxyethylene stearyl ether (having an alkyl ether moiety having 18 carbon atoms) in an amount of 0.2 part by weight was mixed relative to 100 parts by weight of the phenolic resin A-U. A composition comprising 100 parts by weight of the mixed phenolic resin, 7 parts by weight of a mixture of 50% by weight of isopentane and 50% by weight of isobutane as a foaming agent, and 14 parts by weight of a mixture of 80% by weight of xylene sulfonic acid and 20% by weight of diethylene glycol as an acid curing catalyst was supplied to a mixing head controlled to a temperature of 25° C. and then supplied on a moving bottom surface material through a multi-port distribution tube. A mixer used was the one disclosed in Japanese Patent Application Laid-Open Publication No. 10225993. Specifically, the mixer has, on the upper side surface, an inlet port for a resin composition comprising a phenolic resin with a surfactant added thereto and an inlet port for a foaming agent, and has an inlet port for a curing catalyst on the side surface near the center of the stirring part which is stirred by a rotator. A part after the stirring part is connected to nozzles for discharging foam. That is, a part to the catalyst inlet port is defined as a mixing part (former part); a part from the catalyst inlet port to the stirring completion part is defined as a mixing part (latter part); and a part from the stirring completion part to nozzles is defined as a distribution part, and the mixer is composed of these parts.

The distribution part has a plurality of nozzles at the tip and is designed so that the mixed expandable phenolic resin composition may be uniformly distributed.

As a surface material, a nonwoven fabric made from polyester ("Span Bond E05030" having a basis weight of 30 g/m$^2$ and a thickness of 0.15 mm, manufactured by Asahi Kasei Fibers Corporation) was used.

The expandable phenolic resin composition supplied on the bottom surface material was covered with a top surface material, simultaneously fed to a slat type double conveyor at 85° C. so that the composition is put between the top and bottom surface materials, cured by a residence time of 15 minutes, and then cured in a 110° C. oven for 2 hours to obtain a phenolic resin foam. The foam was formed into a sheet by properly applying pressure through the surface materials in the top and bottom direction using the slat type double conveyor.

Here, the HLB of the polyoxyethylene stearyl ether, which is a surfactant used, was determined to be 17.6.

Example 2

A phenolic resin foam was obtained in the same manner as in Example 1 except that polyoxyethylene cetyl ether (having an alkyl ether moiety having 16 carbon atoms) was used as a surfactant.

Example 3

A phenolic resin foam was obtained in the same manner as in Example 1 except that polyoxyethylene behenyl ether (having an alkyl ether moiety having 22 carbon atoms) was used as a surfactant.

Example 4

A phenolic resin foam was obtained in the same manner as in Example 1 except that polyoxyethylene myristyl ether (having an alkyl ether moiety having 14 carbon atoms) was used as a surfactant.

Example 5

A phenolic resin foam was obtained in the same manner as in Example 1 except that 0.02 part by weight of the surfactant was mixed relative to 100 parts by weight of the phenolic resin A-U. At this time, the HLB of the polyoxyethylene stearyl ether was determined to be 17.6.

Example 6

A phenolic resin foam was obtained in the same manner as in Example 1 except that 10 parts by weight of the surfactant was mixed relative to 100 parts by weight of the phenolic resin A-U.

Example 7

A phenolic resin foam was obtained in the same manner as in Example 1 except that 0.3 part by weight of the surfactant was mixed relative to 100 parts by weight of the phenolic resin A-U.

Example 8

A phenolic resin foam was obtained in the same manner as in Example 1 except that 5 parts by weight of the surfactant was mixed relative to 100 parts by weight of the phenolic resin A-U.

Example 9

The surfactant in an amount of 0.02 part by weight was mixed relative to 100 parts by weight of the phenolic resin A-U; the foaming agent and the curing catalyst were mixed in the mixer in the same manner as in Example 1; then, the resulting mixture was distributed with the multi-port distribution tube and poured into a die installed downstream of the distribution tube, the die being similar to a die described in Example 1 of Patent Literature 2 composed of the top surface, the bottom surface, the both side surfaces, and the back surface; the mixture was discharged from the die lip discharge port on the bottom surface material to form a sheet; then, the sheet was covered with the top surface material to obtain a phenolic resin foam in the same manner as in Example 1.

Comparative Example 1

A phenolic resin foam was obtained in the same manner as in Example 1 except that a block copolymer of ethylene oxide-propylene oxide was used as a surfactant.

Comparative Example 2

A phenolic resin foam was obtained in the same manner as in Example 1 except that a mixture of a block copolymer of ethylene oxide-propylene oxide and polyoxyethylene dodecylphenyl ether in a weight ratio of 3 to 7 was used as a surfactant.

Comparative Example 3

A phenolic resin foam was obtained in the same manner as in Example 1 except that polyoxyethylene lauryl ether (having an alkyl ether moiety having 12 carbon atoms) was used as a surfactant.

Comparative Example 4

A mixture of a block copolymer of ethylene oxide-propylene oxide and polyoxyethylene dodecylphenyl ether in a weight ratio of 3 to 7 was used as a surfactant; 0.2 part by weight of the surfactant was mixed relative to 100 parts by weight of the phenolic resin A-U; the foaming agent and the curing catalyst were mixed in the mixer in the same manner as in Example 1; then, the resulting mixture was distributed with the multi-port distribution tube and poured into a die installed downstream of the distribution tube, the die being similar to a die described in Example 1 of Patent Literature 2 composed of the top surface, the bottom surface, the both side surfaces, and the back surface; the mixture was discharged from the die discharge port on the bottom surface material to form a sheet; then, the sheet was covered with the top surface material to obtain a phenolic resin foam in the same manner as in Example 1.

The above results are summarized in Table 1. The state of voids is represented by four levels of ◎ ○ Δ X based on the observation of the cross section of a foam. A good product is represented by ◎; a good product having a few voids is represented by ○; the state where voids can be identified is represented by Δ; and the state where voids are present in the whole area and cannot be referred to as a good product is represented by X. With respect to compressive strength, significant change is not observed after 5 hours, 10 hours, and 20 hours in Examples 1 to 9. In Example 9, the state of voids does not get worse after 30 hours. In Comparative Examples 1 to 3, the state of voids is observed in the whole area after 20 hours. In Comparative Example 4, the state of voids was stable for a relatively long operating time since the die was employed, but got worse after 30 hours. With respect to density, significant change is not observed after 10 hours and 20 hours both in Examples and Comparative Examples.

TABLE 1

|  | Alkyl ether moiety carbons | Surfactant amount added | Operating time | State of voids | Compressive strength [N/cm²] | Density [Kg/m³] | Thermal conductivity [W/m·k] | Average cell diameter [μm] | Closed cell content [%] |
| --- | --- | --- | --- | --- | --- | --- | --- | --- | --- |
| Example 1 | 18 | 0.2 | 5 hr | ◎ | 17.1 | 27.1 | 0.019 | 73 | 98 |
|  |  |  | 10 hr | ◎ | 17.1 | 27.1 | 0.019 | 73 | 98 |
|  |  |  | 20 hr | ◎ | 17.0 | 27.3 | 0.019 | 81 | 98 |
| Example 2 | 16 | 0.2 | 5 hr | ◎ | 17.1 | 27.1 | 0.019 | 75 | 98 |
|  |  |  | 10 hr | ◎ | 16.8 | 27.3 | 0.018 | 75 | 97 |
|  |  |  | 20 hr | ◎ | 16.7 | 27.2 | 0.020 | 88 | 97 |
| Example 3 | 22 | 0.2 | 5 hr | ◎ | 17.1 | 27.1 | 0.019 | 75 | 98 |
|  |  |  | 10 hr | ◎ | 16.9 | 27.2 | 0.019 | 78 | 97 |
|  |  |  | 20 hr | ○ | 16.8 | 27.3 | 0.020 | 89 | 95 |
| Example 4 | 14 | 0.2 | 5 hr | ◎ | 17.1 | 27.3 | 0.019 | 73 | 98 |
|  |  |  | 10 hr | ◎ | 17.0 | 27.5 | 0.020 | 73 | 98 |
|  |  |  | 20 hr | ○ | 16.9 | 27.3 | 0.020 | 82 | 96 |
| Example 5 | 18 | 0.02 | 5 hr | ◎ | 17.1 | 27.1 | 0.019 | 73 | 98 |
|  |  |  | 10 hr | ◎ | 16.8 | 27.3 | 0.018 | 75 | 98 |
|  |  |  | 20 hr | ○ | 16.8 | 27.2 | 0.019 | 86 | 96 |
| Example 6 | 18 | 10 | 5 hr | ◎ | 17.1 | 27.1 | 0.019 | 75 | 98 |
|  |  |  | 10 hr | ◎ | 17.0 | 27.3 | 0.018 | 77 | 97 |
|  |  |  | 20 hr | ○ | 16.9 | 27.1 | 0.018 | 89 | 95 |
| Example 7 | 18 | 0.3 | 5 hr | ◎ | 17.1 | 27.3 | 0.019 | 73 | 98 |
|  |  |  | 10 hr | ◎ | 16.8 | 27.4 | 0.019 | 73 | 98 |
|  |  |  | 20 hr | ◎ | 16.9 | 27.5 | 0.019 | 82 | 98 |
| Example 8 | 18 | 5 | 5 hr | ◎ | 17.1 | 27.2 | 0.019 | 73 | 98 |
|  |  |  | 10 hr | ◎ | 16.7 | 27.3 | 0.019 | 74 | 97 |
|  |  |  | 20 hr | ◎ | 16.8 | 27.4 | 0.019 | 85 | 97 |
| Example 9 | 18 | 0.02 | 5 hr | ◎ | 17.1 | 27.1 | 0.019 | 78 | 98 |
|  |  |  | 10 hr | ◎ | 16.8 | 27.1 | 0.019 | 81 | 97 |
|  |  |  | 20 hr | ◎ | 16.8 | 27.1 | 0.019 | 81 | 97 |
|  |  |  | 30 hr | Δ | 15.9 | 26.9 | 0.021 | 92 | 96 |
| Comparative Example 1 | — | 0.2 | 5 hr | ○ | 17.1 | 27.1 | 0.021 | 85 | 97 |
|  |  |  | 10 hr | ○ | 16.8 | 27.1 | 0.021 | 90 | 95 |
|  |  |  | 20 hr | Δ | 15.9 | 27.0 | 0.021 | 95 | 93 |

TABLE 1-continued

| | Alkyl ether moiety carbons | Surfactant amount added | Operating time | State of voids | Compressive strength [N/cm$^2$] | Density [Kg/m$^3$] | Thermal conductivity [W/m·k] | Average cell diameter [μm] | Closed cell content [%] |
|---|---|---|---|---|---|---|---|---|---|
| Comparative Example 2 | — | 0.2 | 5 hr | ○ | 17.1 | 27.1 | 0.021 | 88 | 97 |
| | | | 10 hr | ○ | 16.9 | 27.1 | 0.021 | 91 | 95 |
| | | | 20 hr | X | 13.0 | 27.1 | 0.024 | 103 | 89 |
| Comparative Example 3 | 12 | 0.2 | 5 hr | ○ | 17.1 | 27.1 | 0.021 | 85 | 95 |
| | | | 10 hr | ○ | 16.5 | 27.1 | 0.021 | 91 | 93 |
| | | | 20 hr | X | 12.5 | 27.1 | 0.025 | 108 | 88 |
| Comparative Example 4 | — | 0.2 | 5 hr | ◉ | 17.1 | 27.1 | 0.020 | 80 | 97 |
| | | | 10 hr | ○ | 16.8 | 27.1 | 0.020 | 81 | 97 |
| | | | 20 hr | ○ | 16.5 | 27.1 | 0.021 | 95 | 95 |
| | | | 30 hr | X | 15.0 | 26.9 | 0.025 | 102 | 89 |

The invention claimed is:

1. A phenolic resin foam having a thermal conductivity of 0.018 to 0.021 W/m·k,
wherein the phenolic resin foam is manufactured by foaming and curing an expandable phenolic resin composition comprising: a phenolic resin; an acid curing catalyst for the resin; a foaming agent; and a surfactant, wherein
the foaming agent comprises a hydrocarbon-based foaming agent, wherein the content of the hydrocarbon-based foaming agent in the foaming agent is 50% by weight or more; and
the surfactant is a polyoxyethylene alkyl ether having an alkyl ether moiety having 14 to 22 carbon atoms, and the content of the surfactant is 0.01 to 10 parts by weight relative to 100 parts by weight of the phenolic resin.

2. A method for producing a phenolic resin foam having a thermal conductivity of 0.018 to 0.021 W/m·k, comprising: foaming and curing an expandable phenolic resin composition comprising a phenolic resin, an acid curing catalyst for the resin, a foaming agent, and a surfactant, wherein
the foaming agent comprises a hydrocarbon-based foaming agent, wherein the content of the hydrocarbon-based foaming agent in the foaming agent is 50% by weight or more; and
the surfactant is a polyoxyethylene alkyl ether having an alkyl ether moiety having 14 to 22 carbon atoms, and the content of the surfactant is 0.01 to 10 parts by weight relative to 100 parts by weight of the phenolic resin.

3. The production method according to claim 2, wherein the alkyl ether moiety has 16 to 18 carbon atoms.

4. The production method according to claim 2, wherein the content of the surfactant is 0.3 to 5 parts by weight relative to 100 parts by weight of the phenolic resin.

5. The production method according to claim 2, wherein the polyoxyethylene alkyl ether is a polyoxyethylene alkyl ether having an HLB of 15 to 20.

6. The production method according to claim 2, wherein the foaming agent consists of the hydrocarbon-based foaming agent.

7. The phenolic resin foam according to claim 1, wherein the content of the hydrocarbon-based foaming agent in the foaming agent is 70% by weight or more.

8. The phenolic resin foam according to claim 1, wherein the curing temperature of the expandable phenolic resin composition is 40° C. to 130° C.

9. The production method according to claim 2, wherein the content of the hydrocarbon-based foaming agent in the foaming agent is 70% by weight or more.

10. The production method according to claim 2, wherein the curing temperature of the expandable phenolic resin composition is 40° C. to 130° C.

* * * * *

UNITED STATES PATENT AND TRADEMARK OFFICE
CERTIFICATE OF CORRECTION

PATENT NO. : 9,120,904 B2  
APPLICATION NO. : 13/128096  
DATED : September 1, 2015  
INVENTOR(S) : Takatoshi Kitagawa et al.

Page 1 of 1

It is certified that error appears in the above-identified patent and that said Letters Patent is hereby corrected as shown below:

ON THE TITLE PAGE;

At item (73), Assignee, change "ASAHI KASEI CONTRUCTION MATERIALS CORPORATION, Tokyo (JP)" to --ASAHI KASEI CONSTRUCTION MATERIALS CORPORATION, Tokyo (JP)--.

Signed and Sealed this  
Twenty-third Day of February, 2016

Michelle K. Lee  
*Director of the United States Patent and Trademark Office*